United States Patent
Williams (10) Patent No.: US 8,363,837 B2
(45) Date of Patent: Jan. 29, 2013

(54) DATA STORAGE DEVICE WITH DATA TRANSFORMATION CAPABILITY

(75) Inventor: Larry Lynn Williams, Los Altos, CA (US)

(73) Assignee: HGST Netherlands B.V., Amsterdam (NL)

(*) Notice: Subject to any disclaimer, the term of this patent is extended or adjusted under 35 U.S.C. 154(b) by 2245 days.

(21) Appl. No.: 11/069,312

(22) Filed: Feb. 28, 2005

(65) Prior Publication Data

US 2006/0193470 A1   Aug. 31, 2006

(51) Int. Cl.
- *H04L 9/00* (2006.01)
- *G06F 12/14* (2006.01)
- *H04L 29/06* (2006.01)

(52) U.S. Cl. ........ 380/259; 380/202; 380/277; 713/161; 713/165; 713/171; 713/182; 713/193; 713/194; 726/1; 726/2; 726/4; 726/22; 726/23; 726/26; 726/27; 726/29; 726/30; 711/100

(58) Field of Classification Search .................. 380/202, 380/259; 713/165; 711/100; 726/2, 22, 726/26

See application file for complete search history.

(56) References Cited

U.S. PATENT DOCUMENTS

| | | | |
|---|---|---|---|
| 5,659,801 A | 8/1997 | Kopsaftis | |
| 5,761,498 A * | 6/1998 | Ooe et al. | 1/1 |
| 5,991,806 A * | 11/1999 | McHann, Jr. | 709/224 |
| 6,006,029 A * | 12/1999 | Bianchi et al. | 703/24 |
| 6,047,103 A * | 4/2000 | Yamauchi et al. | 386/94 |
| 6,049,612 A * | 4/2000 | Fielder et al. | 380/44 |
| 6,061,794 A * | 5/2000 | Angelo et al. | 726/3 |
| 6,078,665 A * | 6/2000 | Anderson et al. | 380/28 |
| 6,131,131 A * | 10/2000 | Bassman et al. | 710/15 |
| 6,178,506 B1 * | 1/2001 | Quick, Jr. | 713/168 |
| 6,285,999 B1 | 9/2001 | Page | |
| 6,304,970 B1 * | 10/2001 | Bizzaro et al. | 726/2 |
| 6,421,779 B1 | 7/2002 | Kuroda et al. | |
| 6,789,192 B2 * | 9/2004 | Hirota et al. | 713/172 |
| 6,799,176 B1 | 9/2004 | Page | |
| 6,986,043 B2 * | 1/2006 | Andrew et al. | 713/166 |
| 7,152,047 B1 * | 12/2006 | Nagel | 705/76 |
| 7,155,616 B1 * | 12/2006 | Hamlin | 713/193 |
| 7,526,653 B1 * | 4/2009 | Vogel et al. | 713/186 |
| 2002/0078066 A1 * | 6/2002 | Robinson et al. | 707/104.1 |
| 2002/0162075 A1 | 10/2002 | Talagala et al. | |
| 2003/0033536 A1 | 2/2003 | Pak et al. | |
| 2003/0070074 A1 * | 4/2003 | Geller et al. | 713/168 |
| 2003/0165242 A1 * | 9/2003 | Walker | 380/277 |
| 2003/0227703 A1 | 12/2003 | Hinshaw | |
| 2004/0083384 A1 | 4/2004 | Hypponen | |
| 2004/0172538 A1 * | 9/2004 | Satoh et al. | 713/175 |
| 2004/0228533 A1 | 11/2004 | Adelmann | |

(Continued)

*Primary Examiner* — Edan Orgad
*Assistant Examiner* — Jenise E Jackson
(74) *Attorney, Agent, or Firm* — G. Martin Knight (57) ABSTRACT

In a preferred embodiment a method of operating an intelligent disk drive is described which includes compression and/or encryption capability at the file level. The intelligent disk drive includes means for executing distributed computing tasks including a CPU and associated memory. The communication interface with the host computer or other device on the communication bus is modified to allow the device to send executable code for a task to the drive and to allow the drive to communicate the results and status information about the task to the host device. In a preferred embodiment the disk drive has a task control program, task program code, task data and status information for the distributed task. The task control program implements the basic task management functions of storing the task program, reporting results and saving progress information to allow the task to be interrupted by other drive functions.

1 Claim, 8 Drawing Sheets

U.S. PATENT DOCUMENTS

| | | |
|---|---|---|
| 2004/0243745 A1 | 12/2004 | Bolt et al. |
| 2004/0252833 A1* | 12/2004 | Milner ............... 380/200 |
| 2005/0033669 A1* | 2/2005 | Stremler et al. ......... 705/30 |
| 2005/0038756 A1* | 2/2005 | Nagel ................ 705/76 |
| 2005/0160277 A1* | 7/2005 | Sciupac .............. 713/185 |
| 2005/0192686 A1* | 9/2005 | Hirota et al. .......... 700/94 |
| 2006/0002701 A1* | 1/2006 | Takayama ............. 396/287 |
| 2007/0061572 A1* | 3/2007 | Imai et al. ........... 713/169 |
| 2007/0143632 A1* | 6/2007 | Matsuzaki et al. ...... 713/193 |
| 2008/0133772 A1* | 6/2008 | Kazar et al. .......... 709/238 |
| 2008/0235517 A1* | 9/2008 | Ohmori et al. ......... 713/187 |
| 2009/0271459 A1* | 10/2009 | Kazar et al. .......... 707/205 |

* cited by examiner

DATA STORAGE DEVICE WITH DATA TRANSFORMATION CAPABILITY

FIELD OF THE INVENTION

The invention relates to data storage devices such as disk drives, the architecture of the communication interface between the data storage devices and host computer and more particularly to methods and means for executing programs on the data storage device to implement data transformation, such as compression and encryption, inside the disk drive.

BACKGROUND OF THE INVENTION

Prior art data storage devices such as disk drives have drive control systems include means for accepting commands from a host computer including commands related to self-testing, calibration and power management. Each drive has programming code (microcode) in nonvolatile memory for execution by a controller, which is a special purpose processor, to enable it to perform essential functions. The microcode can be updated through the drive's communication interface as described, for example, in U.S. Pat. No. 5,659,801 to Kopsaftis. Various standard communication interfaces with both hardware components and command protocols are commonly used such as IDE, SCSI, Serial ATA, and Fibre Channel Arbitrated Loop (FC-AL).

Commercially available disk drives cannot perform any operation on the data other than those directly related to its storage such as, for example, performing error correction computations. There have been some suggestions for enhancing disk drives (HDD) by adding an application-specific component for receiving and executing application-specific instructions. Published US patent application 20030227703 by F. D. Hinshaw, describes application-specific components which can perform application-specific tasks, such as database operations, using data on the HDDs and return results to a local host or even a remote host via a network. Examples of the application-specific component include a circuit board or an integrated circuit such as an Application Specific Integrated Circuit (ASIC), Field Programmable Gate Array (FPGA), Central Processing Unit (CPU), or Digital Signal Processor (DSP). The additional component is capable of receiving application-specific instructions via a standard network connection and executing these application-specific instructions on the data contained on the disks. The application-specific component may be in the form of an add-on board which couples to the controller circuit or, alternatively, in the form of an application-specific chip which mates with a socket provided on the controller circuit.

In US patent application 20020162075 by Talagala, et al. a storage system is described which includes a storage array controller and a storage array. The storage array controller issues scrubbing operation commands to one or more of the disk drive controllers. In response, each disk drive controller that receives a scrubbing operation command reads data from within a data range from at least one of the disk drives, calculates a new checksum for the data, and compares the new checksum to a preexisting checksum for the data. If the new checksum doesn't equal the preexisting checksum, the data within the data range is determined to be erroneous.

In US patent application 20040243745 by Bolt, et al., Dec. 2, 2004, a storage system may include a compression device associated with a controller and at least one storage device where the controller is adapted to receive a sequence of data, divide the sequence of data into two or more blocks of data, and compress at least two of the two or more blocks in parallel. The system may further create an index associated with the blocks of data to output the data as a continuous stream of data. The exemplary compression device may provide for fibre channel, Ethernet, SCSI, and other host bus interfaces as well as hardware data compression, ECC, CRC, and data encryption. In one example, dedicated hardware is included to perform parallel compression of the blocks, and reconfigurable hardware is included to perform various data protection methods, such as error correction methods and the like.

In US patent application 20040228533 by Adelmann a method is described for managing data compression activities within a removable storage device that Is receivable by a host device. An exemplary embodiment of the storage device typically includes a storage medium for storing received and compressed data. The storage device further includes a processor for managing data compression functions and writing received and compressed data to the storage medium.

In U.S. Pat. No. 6,421,779, "Electronic Data Storage, Apparatus, System and Method", a method is described for storing critical data on floppy disks or cd-roms. A "computer in secure case" is used where the floppy disks are loaded to be processed.

SUMMARY OF THE INVENTION

An intelligent disk drive is described which includes means for executing distributed computing tasks including a CPU and associated memory. The communication interface with the host computer is modified to allow the host computer or other device on a communication bus to send executable code for a task to the drive and to allow the drive to communicate the results and status information about the task to the host device. In a preferred embodiment the disk drive has a task control program, task program code, task data and status information for the distributed task. The task control program implements the basic task management functions of storing the task program, reporting results and saving progress information to allow the task to be interrupted by other drive functions. In alternative embodiments, the disk drive can communicate with other similar disk drives in the bus to provide the results of computation to the other processors. The disk storage, RAM memory, and processor are intimately connected so that the exact location of the required data and program instructions are known. This architecture requires fewer resources than the previous architecture because each series of instructions and set of data can be fetched immediately as required by the CPU rather than loading complete files to the CPU over the interface.

In a preferred embodiment a method of operating the intelligent disk drive Is described which includes compression and/or encryption capability at the file level. The compression and encryption functions can be performed in-line or as an offline task.

DETAILED DESCRIPTION OF THE INVENTION AND THE PREFERRED EMBODIMENTS

Figure 1:
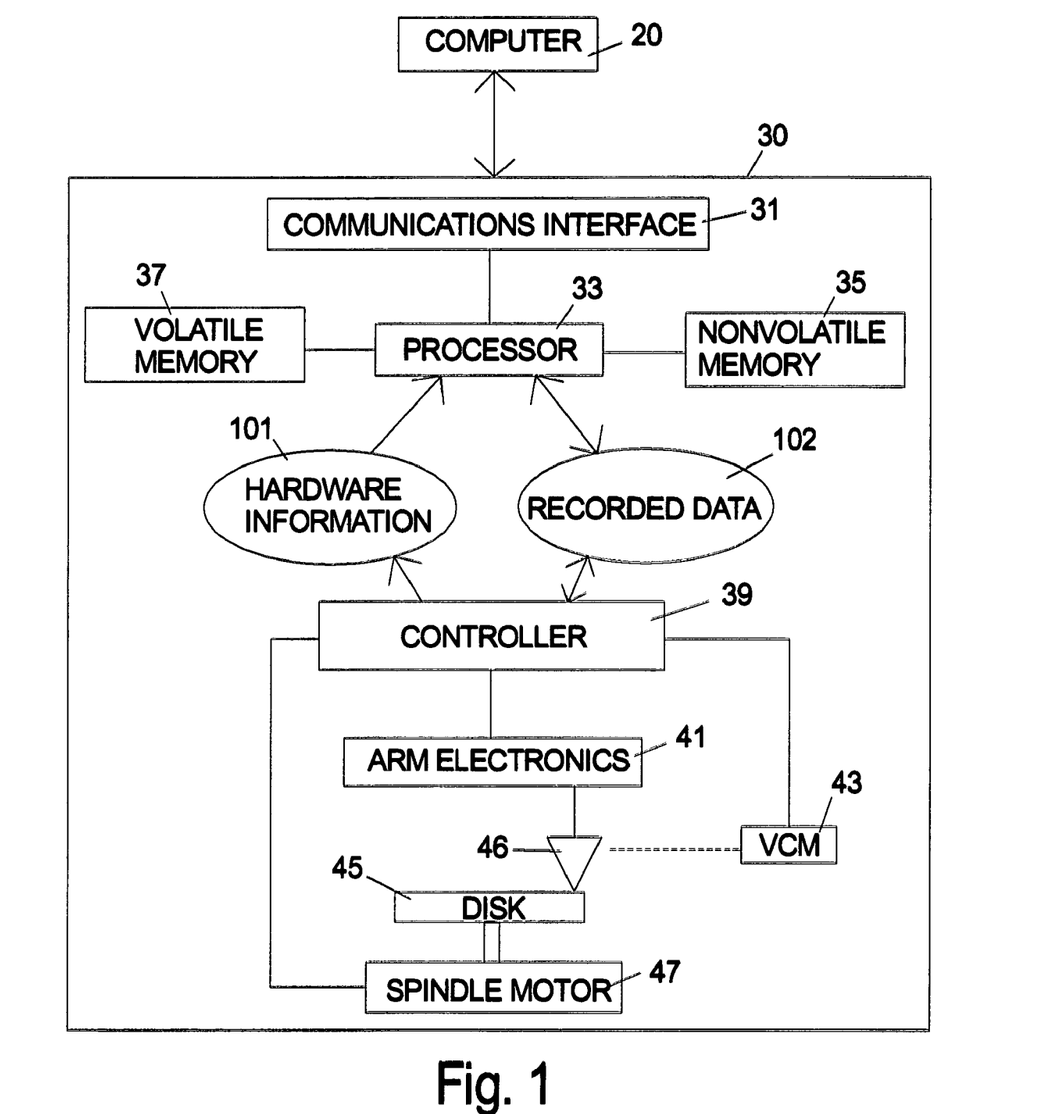
FIG. 1 is an illustration of selected components of a disk drive according to the invention.

FIG. 1 is a symbolic illustration of a disk drive 30 according to the invention which will be called an "intelligent disk drive." Information, commands, data, etc. flow back and forth between the host computer 20 and the disk drive 30 through communications interface 31 which can be any prior art hardware interface. The disk drive includes a general purpose microprocessor 33 which accesses both volatile memory 37 and nonvolatile memory 35. The program code for the microprocessor 33 can be stored in either the volatile memory 37 or nonvolatile memory 35. The program code can originate in the nonvolatile memory 35 in the form of a preprogrammed device such as an EEprom. The program code can also originate from the host computer 20. The disk drive 30 is shown as including a separate controller 39, but in an alternative embodiment the microprocessor can be designed to handle all of the tasks normally performed by a controller and the controller can be omitted. The arm electronics 41, voice coil motor (VCM) 43, disk 45, spindle motor 47 and head 46 are according to the prior art. In each embodiment the microprocessor has access to the hardware information 101 which includes detailed information about the state of the components which can be used to optimize the execution of the special purpose tasks which are defined herein. The recorded data 102 is the standard data which is stored on and retrieved from the disk drive.

Figure 2:
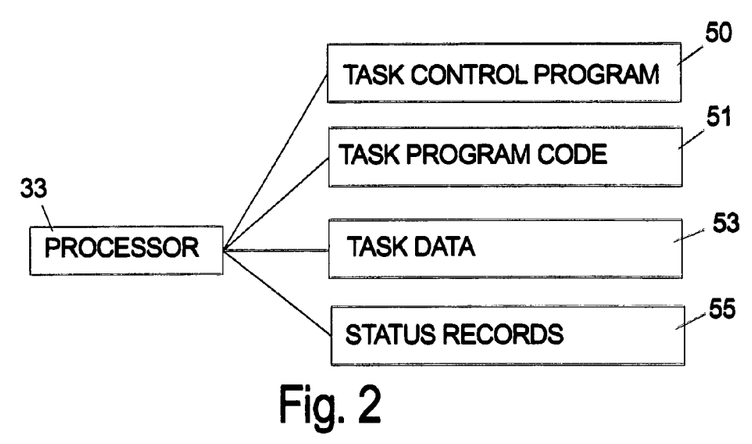
FIG. 2 is an illustration of distributed task data organization in a disk drive according to an embodiment of the invention.

The disk drive according to the invention is designed to execute distributed and/or parallel computing tasks. FIG. 2 illustrates the organization of the program and data used by the processor 33 for the task. In the embodiment described herein the disk drive has a task control program 50, task program code 51, task data 53 and status information for the distributed task 55. The task control program 50 can be loaded into memory from the disk at startup or stored in nonvolatile storage. The task control program 50 implements the basic task management functions of storing the task program, reporting results and saving progress information to allow the task to be interrupted by other drive functions. The prior art communications interfaces (IDE, SCSI, Serial ATA, Fibre Channel Arbitrated Loop (FC-AL), etc.) used between host computers and disk drives define a format through which the host can give commands and data to the disk drive. The invention can be implemented within the general framework of any of these systems with limited modifications which will described below. One modification according to the invention provides a method for the computer to send executable code and data defining a task to the disk drive for temporary or long term storage in volatile or nonvolatile memory or on the disk. Preferably the drive executes the task in the background to use otherwise free time to perform the task.

The basic command interface of the intelligent disk drive can be implemented in a variety of ways. Entirely new commands can be defined or existing commands can be modified. One particular embodiment to illustrate the invention will be described. In the prior art SCSI environment there are sufficient prior art commands to accomplish the task. However, in the preferred embodiment the intelligent disk drive must also act as an initiator rather than a simple slave. SCSI commands will be used as an example, but similar commands can be used for other interfaces such as IDE, Fiber Channel, etc. The SCSI communication link between the host and the disk drive uses a Command Descriptor Block (CDB). When the host sends a command down the SCSI BUS, each drive reads the command, but only that drive with the specific drive address. For example, the CDB a simple WRITE(6) command includes fields for:

operation code (0Ah)
logical unit
logical block address
transfer length
control

The first Byte contains the operation code, the next three bits contain the SCSI unit (disk drive), the next byte is the length of the transfer, and the final byte contains various control information. Other commands may require more or less bytes for the command, but the structure is similar to the one shown. For a disk drive, a simple subset of the commands are:

FORMAT UNIT
LOCK UNLOCK CACHE
PRE-FETCH
READ(6)
READ(10)
READ DEFECT DATA
READ LONG
REASSIGN BLOCKS
RELEASE
RESERVE
REZERO UNIT
SEARCH DATA
SEARCH DATA EQUAL
SEARCH DATA HIGH
SEARCH DATA LOW
SEEK(6) AND SEEK(10)
SET LIMITS
START STOP UNIT
SYNCHRONIZE CACHE
VERIFY
WRITE(6)
WRITE(10)
WRITE AND VERIFY
WRITE LONG
WRITE SAME
SEND DIAGNOSTIC
RECEIVE DIAGNOSTIC

In the common usage of the SCSI standard, there is one "initiator" on the BUS and one or more slave devices. The slaves do not send instructions over the BUS unless they receive a request from the host. But the recent SCSI standard allows for multiple "initiators" on the same BUS which could be more than one host or the initiator could also be in the intelligent disk drive. In the following discussion it is assumed that the various hosts and the intelligent disk drives all have the capability to send or receive commands from any host or intelligent disk drive on the BUS.

Figure 3:
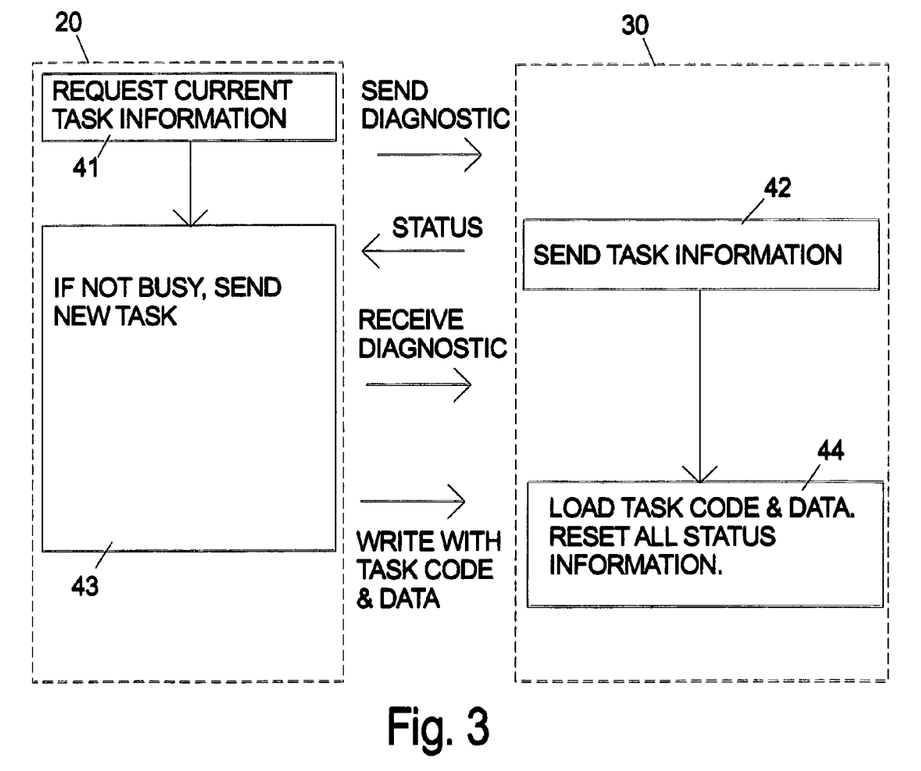
FIG. 3 is an illustration of an embodiment of the process of loading the task into a disk drive according to the invention.

The task program can conveniently be transmitted and updated through the SEND DIAGNOSTIC and RECEIVE DIAGNOSTIC commands as illustrated In FIG. 3. The host 20 can query the drive by sending a SEND DIAGNOSTIC command 41 to the disk drive. The intelligent disk drive responds by sending a block of information which includes information on the task currently defined 42. To define a new task, the host sends the intelligent disk drive a RECEIVE DIAGNOSTIC command to signal the drive to expect the task definition and then follows with a WRITE command that contains the definition of the task. The task definition can include the executable code for the task and the identity of the data. The executable code and data can be literally included In the data area of the write CDB or pointers can be used to specify data and code stored on the disk. The drive stores the task definition in the WRITE command as the new task program and initializes all of the status flags, pointers, etc. to indicate the starting point 44. In the case of multiple hosts, the intelligent disk drive optionally can accept task from only authorized hosts.

Once a distributed task is defined for the drive, the execution of the task proceeds according to the prior art multitasking computing techniques. The distributed task becomes one of potentially many things that the drive has to do. As known prior art, tasks are assigned a priority level to allocate the CPU resources. Preferably the distributed task is assigned a low priority so that it runs in the background without interfering with the standard disk drive functions.

Figure 4:
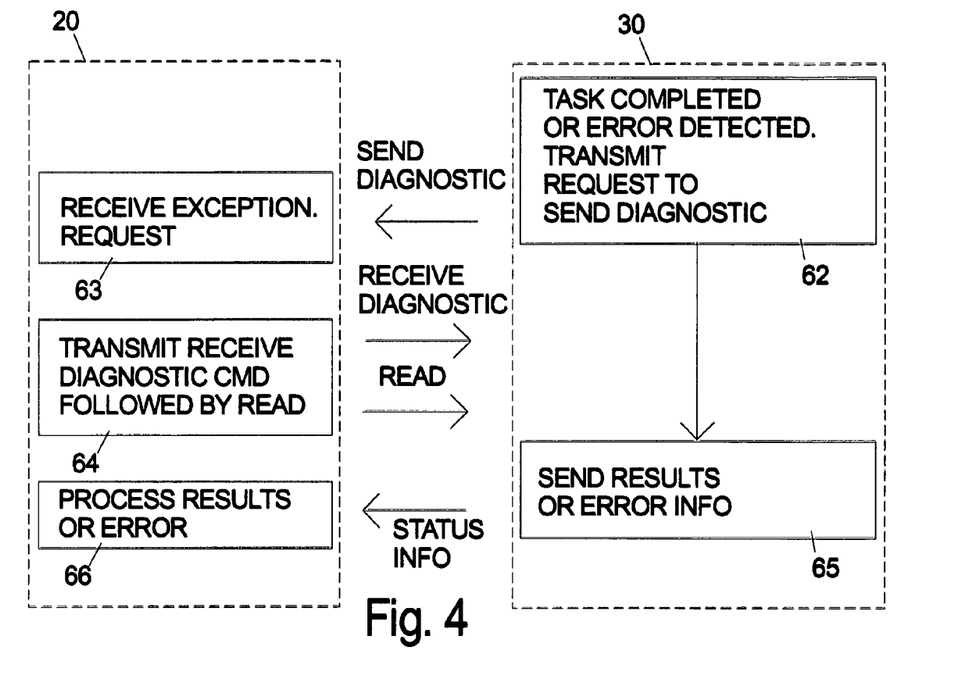
FIG. 4 is an illustration of an embodiment of the process of reporting task results from a disk drive to a host computer according to the invention.

When the disk drive needs to communicate information about the task to the host, the drive initiates a communication sequence by signaling the host (or hosts). The communication about the task could be an error message or a completion message. In one embodiment illustrated in FIG. 4 this is done by transmitting a SEND DIAGNOSTIC command 62, which is used in the prior art for error conditions, to indicate that a problem has been detected with the file the host has requested. In this embodiment the existing SEND DIAGNOSTIC protocol is modified to include means for communicating error conditions relating to the task and the results of the task. The host receives the SEND DIAGNOSTIC command as an exception 63. It continues the dialog by requesting the details by issuing a RECEIVE DIAGNOSTIC command to the intelligent disk drive followed by a READ command 64 which serves as a request for the status details and allows the drive to put relevant data in data area of the response to the read command. The intelligent disk drive interprets the sequence of commands as a command to transfer the task specific information to the host 65. Once the host has received the detailed information, it can decide upon appropriate further action such as sending a new task to the drive 66.

The communication interface is used only to communicate the results each computation to the host and optionally other processors in the array. The mass data storage, RAM memory, and task program are intimately connected such that the exact location of the required data and program instructions are known. This architecture requires fewer resources than the previous architecture because each series of instructions and set of data can be fetched immediately as required by the CPU rather than loading complete files to the CPU over the interface. For example, if a complete program, with it's associated branches requires 100 MB, but the current process only requires 1 MB of the code, only that portion of the instructions would be loaded and the remainder would remain on the mass storage until it was required. This architecture Is a much faster implementation (the objective of parallel processing systems) while potentially limiting the cost. Thus a parallel processing task can be accomplished with fewer resources than one that has more overhead and consequently requires more processors and possible more time.

In contrast to the prior art disk drive architecture, the invention describes an architecture with a CPU and task control program inside the disk drive. Logically the CPU is positioned inside the SCSI or other interface so the hand shaking overhead necessary for communication over that interface is avoided for the actual task execution. The principal communication to the disk drive (mass storage) is only through the hard disk controller. On some applications, the hardware necessary for the CPU and the HDC may be merged.

In this implementation the CPU need only fetch the portions of the program that are currently necessary because the HDC can be programmed to keep other parts of the program available on mass storage as needed. It now has the ability to do "stream processing" in which each block of a large data stream (such as a video file) can be read, processes, and stored as the next block is being read. This architecture supports the most general parallel computing architecture described earlier, so any task that Is amenable to parallel computing can be accomplished with an array of such disk drives. Even though there are several architectures for parallel computers, the architecture that contains the CPU inside the disk drive will support any one of the designs, and results In a simpler implementation that has higher speed because of the elimination of much of the overhead in a typical computer architecture. Although this architecture is advantageous in a single-instruction single-data application, it is even more advantageous in other architectures such as multiple-instruction multiple-data architectures where overhead is a significant part of the computational time.

Figure 5:
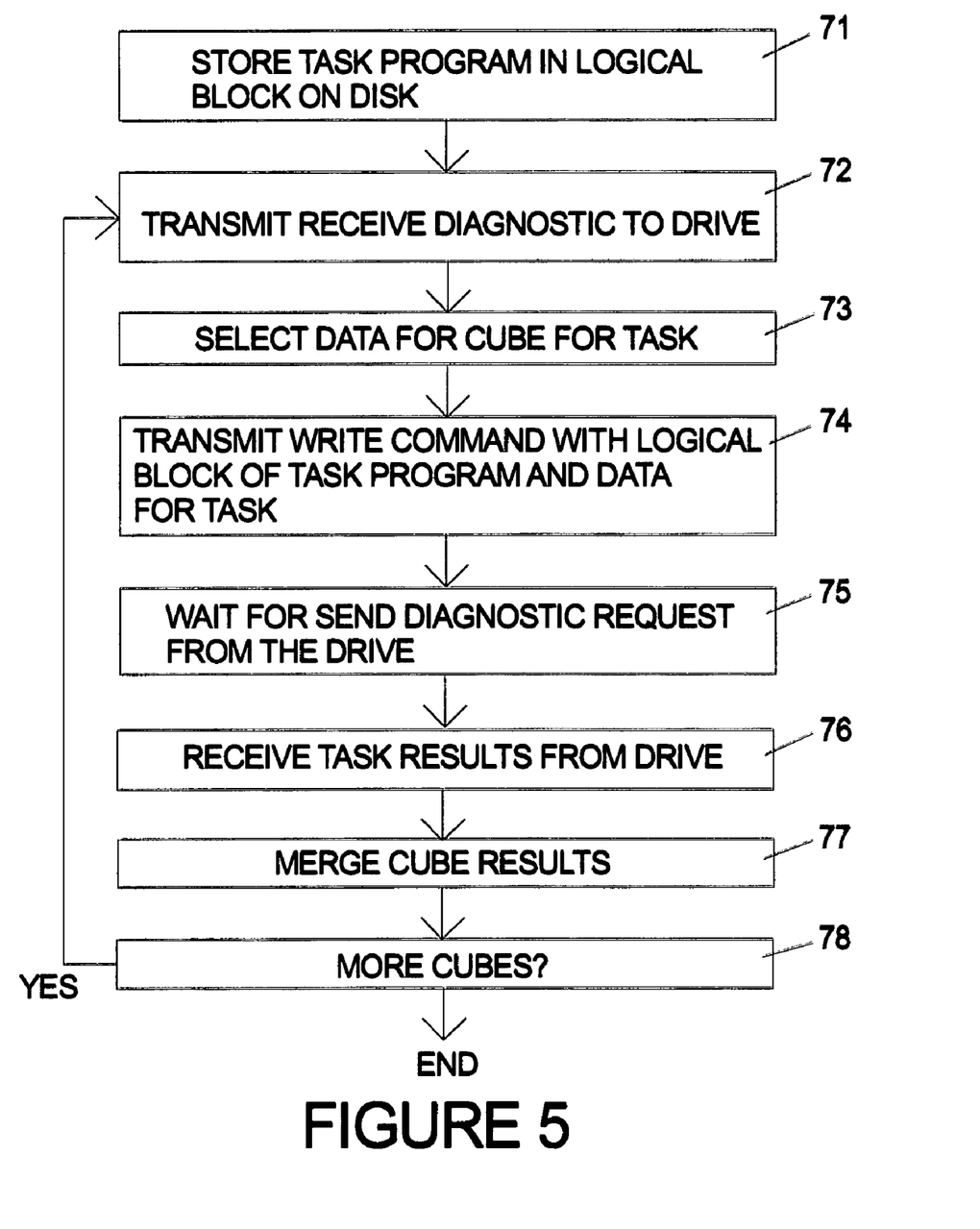
FIG. 5 is a flowchart illustrating the steps performed by a host to manage the task in the intelligent disk drive.

A flowchart illustrating the steps performed by a host to manage the task in the intelligent disk drive is given in FIG. 5. The executable code for the task can be transmitted to the drive and identified to the drive in a variety of ways. One alternative, shown in FIG. 5, is for the host to use standard write commands to write the task code to the disk 71. The host then transmits the RECEIVE DIAGNOSTIC command to the drive 72. The task data for the cube is selected 73. The write command which defines the task can then specify the logical block on the disk where the code was previously stored and sends the task data in-line 74. For a large block of code or one which is used repeatedly as in the present example, new code does not need to be sent to the drive to start each task. The host then waits for the drive to signal completion of the task with a SEND DIAGNOSTIC request 75. The results of the computations on the data are received 76 and merged with the other data from other drives 77. If more cubes are left to be processed, the host loops to the transmit step 72 to begin the process of starting the drive on a new cube.

Figure 6:
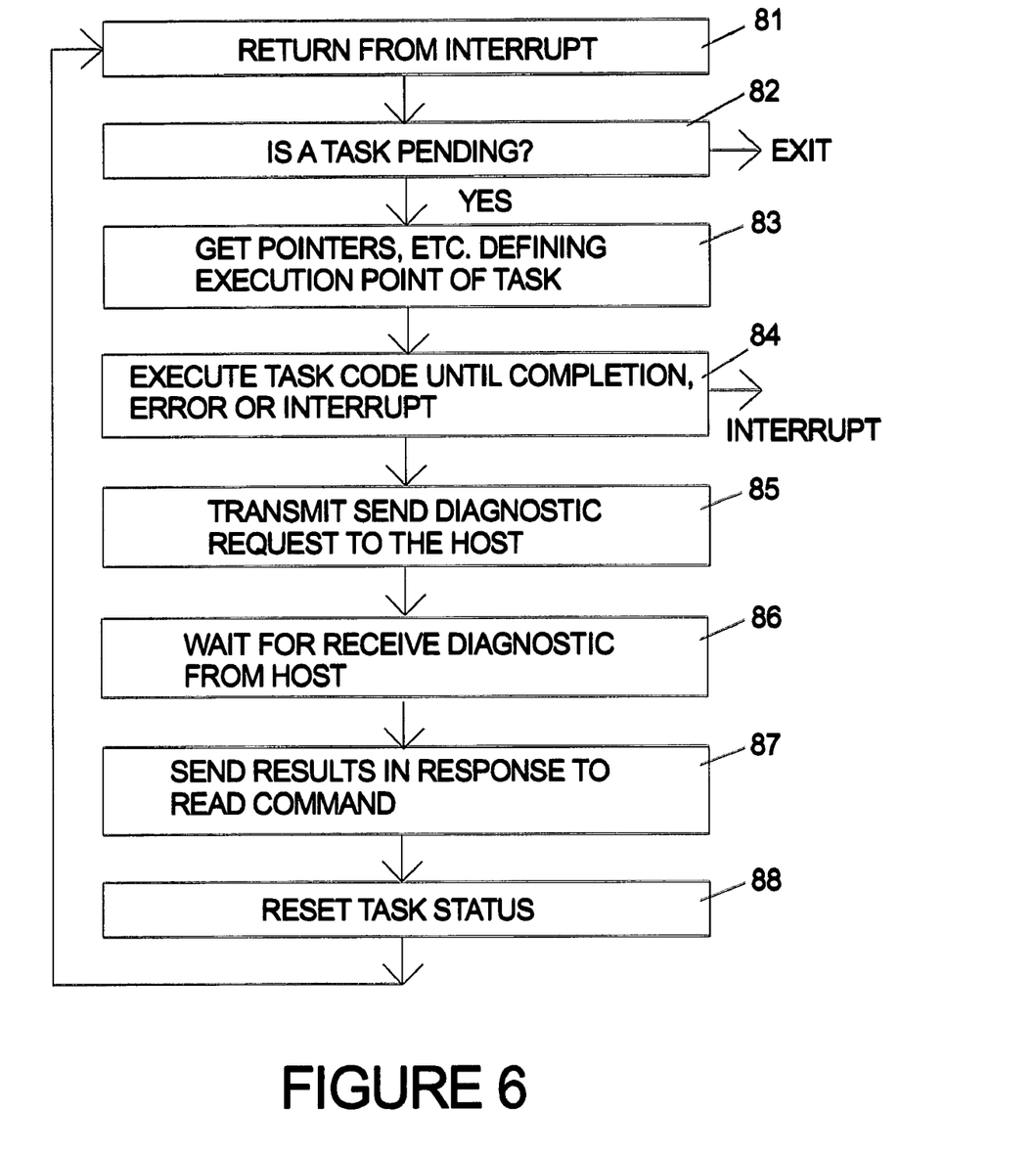
FIG. 6 is a flowchart illustrating the steps performed by an intelligent disk drive to execute a task according to the invention.

FIG. 6 is a flowchart illustrating the steps performed by an intelligent disk drive to execute a task according to the invention. The execution of various functions of the intelligent disk drive are generally interrupt driven as is the case for many systems having a plurality of real-time control and communications tasks. The definition of the task as shown in FIG. 3 is preferably interrupt driven. The execution of the distributed task is itself subject to being interrupted and upon return from an interrupt 81 the task control program preferably checks for a pending task 82. The status flags and pointers associated with the task will record whether a task is pending and sufficient information to allow the execution of the task to resume. This status information must be saved whenever a distributed task is interrupted (not shown) and it is reloaded when the task execution is resumed 83. The execution of the task continues until another interrupt occurs, an error is encountered or the task is completed 84. For an error or completion the task control program sends a SEND DIAGNOSTIC request to the host 85. The task control program waits for the host to send the RECEIVE DIAGNOSTIC command 86 and then sends the block of data for the error or completion to the host in response to the next read command 87. The task control program then resets the task status flags to indicate that no task is pending 88 and returns to normal interrupt driven processing.

The time for one rotation of the disk in current disk drives can be estimated as 4 to 10 milliseconds. Since microprocessors are available which operate on GHz clocks, times in milliseconds potentially allow time for significant processing to occur while the drive would otherwise be waiting on the mechanical components. In a preferred embodiment the execution of the task program occurs in parallel with the normal disk drive functions so that negligible delay, if any, occurs in delivering the data read from the drive.

In a system configuration, where there are a plurality of intelligent disk drives on the same BUS the intelligent disk drive can communicate directly with other the other intelligent disk drives. Therefore, in one advanced embodiment, the means for communicating to other intelligent disk drives could be made part of the task control program or it could be included in the task code.

Use of Simultaneous Read and Write Capability

Currently available disk drives can only read or write from a single head at a time, due to cost factors, as well as, the need to make micro-adjustments to keep the head on a track and compensate for physical variations around a single track. Variations between two comparable tracks one different disk surfaces can be sufficiently large to make it impossible to read or write simultaneously without the introduction of microactuators on each head which could adjust the position of the Individual head to allow it to stay on a track which varies significantly from the similar track on another disk surface. Currently available disk drives have only one actuator for the entire set of heads, but disk drives with two actuators have been produced. Disk drives have also been produced which had a set of so-called "fixed heads" which accessed a single track in addition the standard moveable heads. Thus, it is possible to design disk drives with the capability to write and/or read from more than head simultaneously. The Intelligent disk drive could be implemented with any of these variations to enhance the capability to execute the distributed or parallel task.

File Level Interaction

In a preferred embodiment a command protocol is implemented to allow the intelligent disk drive to receive and send complete files to and from the host. In the standard system the disk drive has no knowledge of host's system for maintaining files. The host is responsible for keeping track of all of the logical blocks of disk drive storage that it has used for a particular file. The intelligent disk drive can have its own file system. In this embodiment the host can send and receive complete files associated with a unique identifier such as a file name and extension. The intelligent disk drive can then use the additional knowledge associated with this capability for compression and encryption. Since compression reduces the size of the file, the size of the file on the actual disk will be smaller than what the host would otherwise think. By allowing the drive to send and receive complete files, the compression can be managed transparently by the drive. The use of intelligent disk drive compression in an integrated system should include a protocol for determining whether a file should be compressed, and whether it should be de-compressed when it is retrieved by the host. A command parameter should be established to either force or override compression, but a default scheme could use the file type to trigger compression. In the typical system, some of the files must be compressed and others may not be compressed. For example, any file with a .CDA extension may be compressed to another compressed MP3 file with an .MP3 extension. It is also feasible for the host to send the intelligent disk drive executable code similar to a task which can be used to compress or decompress a file.

In one preferred implementation, the intelligent disk drive communicates with the host through a SCSII channel. The SEND DIAGNOSTIC and RECEIVE DIAGNOSTIC commands can be modified to send a receive host/drive commands without changing the SCSII command set. It is also possible to modify the SCSII commands for those cases that require more extensive host/drive communication. In either case, the protocol for compressing files is transmitted to the intelligent disk drive by the host. For example, the host can instruct the intelligent disk drive to compress all CDA files to MP3, compress (when commanded) movie files to MPG, and compress all files with a designated special extension (such as KNG) using a compression program that accompanies the file. All of these are possible since the intelligent disk drive can communicate with the host, and can receive special code for unusual compression techniques while maintaining common compression techniques either in the intelligent disk drive RAM or loadable compression programs stored on the disk.

Data Compression

Data compression is a process for compressing information on a storage medium. Compression algorithms are designed to compress information with particular statistical characteristics. For example, a zero-order algorithm assumes that the occurrence of any particular character in the set of possible characters is equally likely. For the most part, particularly when the characters represent some language, a zero-order model is not appropriate. In a first-order model, the probability a particular character occurs is dependent upon the language, but the occurrence of a particular character is independent of preceding or succeeding characters. This still is still not appropriate for common languages because there is a generally a strong dependence of the probability of occurrence of a particular character on neighboring characters. In a second-order model, the probability of a particular character is dependent upon the immediate preceding character or the immediate succeeding character. The third-order model allows that the probability of occurrence of any character depends upon the two preceding characters and to two succeeding characters. In general, there are many statistical models that can represent a string of data that depend upon the statistical characteristics of the data being compressed. In addition, there are lossless algorithms in which the exact original character string can be recovered, and lossy algorithms that ignore some pathological character strings. If we now extend the idea of data compression to non-character data, such as video or pictures, another set of compression algorithms might be utilizes such as techniques for compressing pictures to a JPEG format or video to an MPEG format.

When various forms of data are stored on a disk file, the compression algorithm can be selected by the host, the data can be compressed by the host, and subsequently stored on the disk file. This technique is adequate as long as the compression and de-compression algorithms are maintained in the host. However, this process is time consuming and maintenance of the compression and de-compression algorithms can be a significant burden on the host. Furthermore, if the storage device is connected to several hosts, maintenance of the algorithms over a series of host, some of which may not have been connected to the storage unit when the data was stored can add an additional burden to the host.

Figure 7:
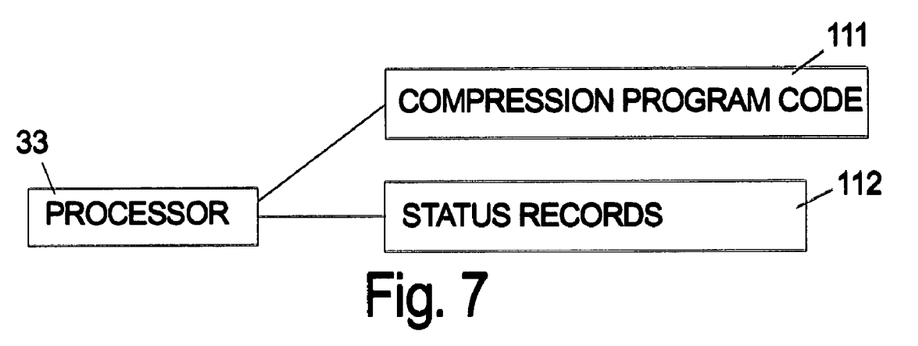
FIG. 7 is symbolic diagram illustrating program and status data organization for an embodiment of the invention performing data compression in the intelligent disk drive.
Figure 8:
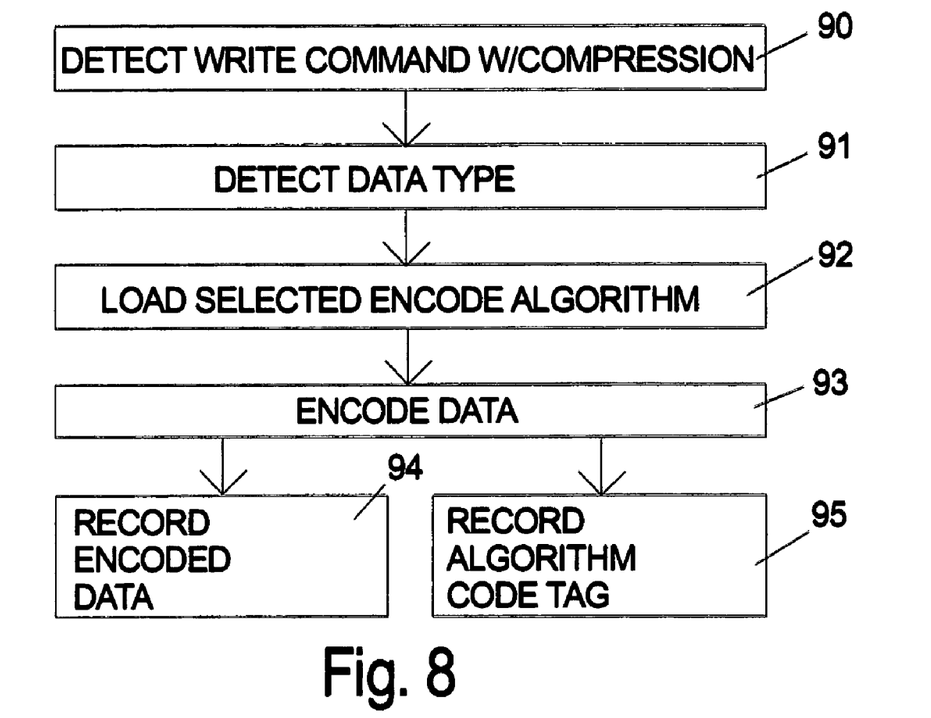
FIG. 8 is a flowchart of a method of compressing data according to the invention.
Figure 9:
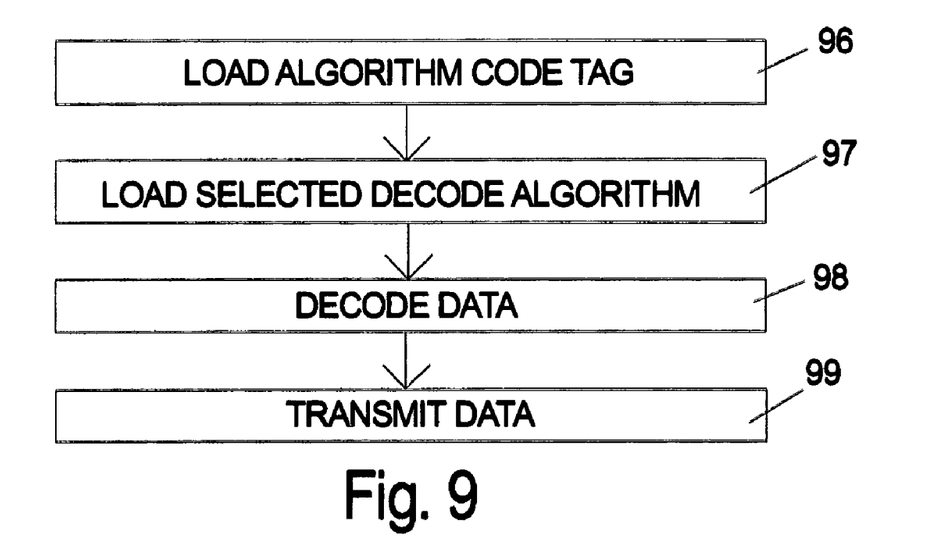
FIG. 9 is a flowchart of a method of de-compressing data according to the invention.

An embodiment of the intelligent disk drive compresses and decompress the incoming or outgoing data stream with a processor contained in the storage unit such that the compression or de-compression algorithm is maintained in the storage unit. The compression capability can be programmed into the intelligent disk drive as a task as described above or the processing capability of the intelligent disk drive could be limited to the compression function. Using the task capability, for example, data could be compressed in the background. The following will describe an embodiment In which in-line compression and decompression are performed by the intelligent disk drive. An embodiment of this invention preferably includes a set of predetermined commands which are used to signal when the intelligent disk drive should perform inline compression on data being written to the disk and includes the ability to send entire files to the drive as described. When a file is stored on the storage unit, the storage unit detects the statistical characteristics of the incoming data stream, selects an appropriate compression algorithm from the stored compression program code 111 in FIG. 7, and compresses the incoming data steam in-line as it is transmitted from the host to the storage unit. A set of tags, tables or status records 112 represent the compression algorithm is stored with the compressed data so that when the file Is read, the de-compression algorithm and tables can be identified. Similarly, when a file is requested by the host, a tag that represents the de-compression algorithm is first read and the de-compression algorithm is loaded into the internal compression/de-compression engine such that as the file is read from the storage medium, the data is decompressed and transmitted to the host. The flow of the storage technique is shown in FIG. 8 for the encoding phase. The predetermined command for write with compression Is detected 90. The first step is to detect the type of data 91. The particular algorithm suitable for the data type is then loaded 92. The program code for the compression can be stored on the disk, in flash memory, etc. The data is then encoded using the selected algorithm 93. The encoded data is stored 94, as well as, a tag which identifies the selected algorithm 95. The de-compression technique is shown in FIG. 9. A command for reading with decompression could be defined, but since the intelligent disk drive knows which blocks are compressed, it is not required. Optionally a command could be defined to suppress the decompression which would allow the host to read the compressed data. One use for this option could be for testing and debugging the intelligent disk drive. As shown in FIG. 9 intelligent disk drive is performing the decompression. The previously stored algorithm tag is loaded 96. The Identified decode algorithm code is loaded 97. The data is decoded 98 and then transmitted to the host 99.

When a file is stored in compressed form on the intelligent disk drive media, the host is not involved with the compression. Similarly, the host is not involved in the decompression since both the compression and de-compression are done in the drive. From the viewpoint of the host, the performance of the storage system is unchanged except that there appears to be more storage available than if compression was not used. In addition, if another host is connected to the disk drive, the data retrieved from the storage unit is decompressed using the algorithm appropriate to the associated compression algorithm. As compression and de-compression algorithms change due to better algorithms or data with other statistics, the internal algorithms can be updated. Furthermore, as a compression algorithm ages such that none of the data stored on the storage unit has been compressed with this algorithm, the algorithm can be deleted.

In summary, in-line compression and decompression by the intelligent disk drive results in little or no impact to the host storing or reading the data, increases the storage capacity of the storage device, simplifies the maintenance of the compression/de-compression algorithms, and allows multiple hosts to be attached to the same storage device without re-distributing the storage algorithms.

Encryption

Passwords are an essential component of secure systems. Although they play a crucial role in authenticating the identity of people to systems, traditional password-based network authentication systems have weaknesses due to improper use of passwords. Such systems often use the password as if it were a cryptographic key, and require the password to be chosen as carefully as one would choose a cryptographic key. One requirement is that the choice be from an effectively large "password-space". The size of this space is sometimes expressed in terms of a number of bits of "entropy". For simplicity, we often refer to any low-entropy secret from a space that is vulnerable to dictionary attacks as a "small password". In practice, due to human limitations, many passwords are small. This is a problem for many systems which can be attacked using a repeated computation using all possible (or likely) guesses for the password. This Is known as a brute-force, or dictionary attack.

Dictionary attacks can occur on-line, in an interaction between an attacker and a legitimate user or system. They can also occur off-line, using information gathered by monitoring messages sent between two legitimate parties during an authentication protocol exchange. On-line attacks can often be easily detected and thwarted, by counting bad attempts and denying access. Banking ATM machines thwart attack by retaining the user's card after three bad access attempts. But remote authentication opens the possibility of an off-line attack on the messages transmitted across a network.

As widely available computing power increases, successful off-line dictionary attacks on a small password become easier. Today, ever-increasing computer power has clearly outpaced the (unchanging) ability of people to remember longer passwords. Today, 56-bit symmetric key seem to offer only marginal security. U.S. export regulations have allowed export of 40-bit key systems, presumably because they are breakable. Thus, in many systems, a "safely large password" requires more than 40 bits of entropy, and the number is steadily growing. On the other hand, it seems that many people cannot easily remember and use a password from a space of 32 bits. This is equivalent to a random 10 digit number, about 6 random letters and digits, or a pair of words from an average English dictionary. Several studies over many years have found that a significant percentage of user-chosen passwords can be found with a modest computational effort, having an effective size of less than 30 bits (roughly a billion choices). At one extreme, bank-card PIN numbers have less than 14 bits. Forcing everyone to double or triple the size of their passwords, and expecting them to not write them down, or expecting most people to be comfortable using "pass-phrases", is denying the inevitable truth. People can't or won't properly handle anything larger than a small password, so systems must protect them from attack. In light of this, most traditional network authentication systems that use passwords are obsolete. Better systems must be designed and deployed that are resistant to off-line dictionary attack, to safely tolerate the use of potentially small passwords.

As confidential and sensitive data is increasingly stored on computer systems, or transmitted over communications networks, including the Internet, it is of increasing importance to have methods and systems to ensure the security of such data. Typically, such data is encrypted as it is stored or transmitted by a computer system and then decrypted when the data is to be accessed after being retrieved or received. Many different approaches are known to those skilled in the art and are available to permit users to encrypt and then decrypt computer data.

To encrypt data, data encryption keys are required. A typical encryption system takes as input the source data to be encrypted and an encryption key. For the same source data, but different encryption keys, a typical encryption system will create different encrypted data. It is intended that only a person knowing the encryption key will be able to decrypt the encrypted data.

It is a poor security practice if one encrypts all data using a single data encryption key or a single set of data encryption keys. This is because by reusing the same key or set of keys, more data are available for analysis of encrypted data (cryptanalysis) for a third party to break the encryption system. Therefore, to ensure the security of a series or collection of encrypted data, for each piece of data (or each occasion) to be encrypted in the series or collection, different data encryption keys are used.

The data encryption keys for each occasion are called session keys because an occasion usually corresponds to a communication session if data are transmitted over a communication network. The term "session key" is also applicable to occasions where no communication is involved but where data encryption is required. The more encrypted data or files one produces the more data encryption keystone has. Matching data encryption keys to the corresponding encrypted data becomes a key management problem if there are many instances of encrypted data and a correspondingly large number of data encryption keys.

Misplacing or losing data encryption keys, or mismatching the data encryption keys and encrypted data, result in the failure to decrypt the encrypted data. It is therefore important to be able to ensure that the correct data encryption keys are associated with the appropriate encrypted data. However, a method of associating the encryption keys with the encrypted data which Is simple and easy to use for the party intended to retrieve the encrypted data will also be potentially simple and easy for unauthorized parties to use, to the detriment of the security of the encrypted data. This potential difficulty is present where the data encryption keys are stored or transmitted together with the encrypted data. Although such a simple system ensures that the encryption keys are available to the recipient or person intended to retrieve the data, others may also find the encryption keys and decrypt the encrypted message.

Security for such a system, where the encryption keys are included with the encrypted message, is not to store or transmit the encryption keys in an easily readable format but rather to encrypt the encryption keys themselves. This approach means that the data encryption keys will be encrypted by a key encryption key. This in turn leads to the problem how to transmit or store the key encryption key so that it remains secure.

In the prior art, a security infrastructure to solve the key management problems is often used. Such a security infrastructure may either involve a key distribution center for a symmetric encryption system or a certificate authority used in asymmetric encryption (public key encryption). A key distribution center generates symmetric key encryption keys and distributes them to users in a secure manner. For asymmetric encryption, a certificate authority issues a certificate to a user, which contains the user's public key and is digitally signed by the certificate authority. A user can generate session keys to encrypt data, then using the receiver's public encryption key the user will encrypt the session keys. The receiver can recover the session keys through decryption using the receiver's private decryption key. Encrypted data can be decrypted using the recovered session keys.

Both key distribution centers and certificate authorities are known to those skilled in the art. Use of such security infrastructures is made in sophisticated computer systems where data security is required. However, for most users, such an infrastructure is unavailable, expensive to implement it, or inconvenient.

It is therefore desirable to have a computer system which is capable of encryption key management without requiring a security infrastructure such as a key distribution center or a certificate authority.

Figure 10:
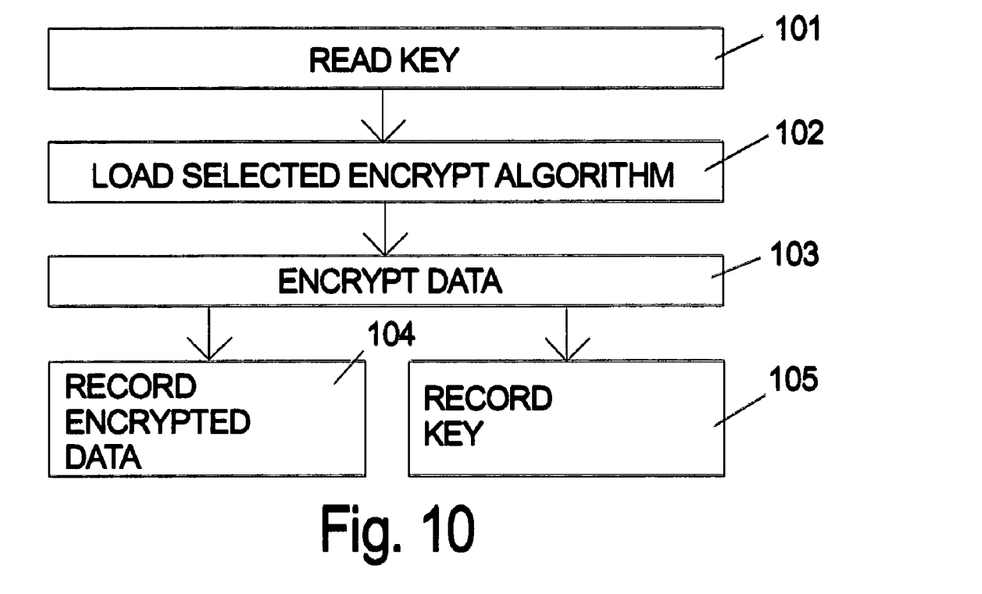
FIG. 10 is a flowchart of a method of encrypting data according to the invention.
Figure 11:
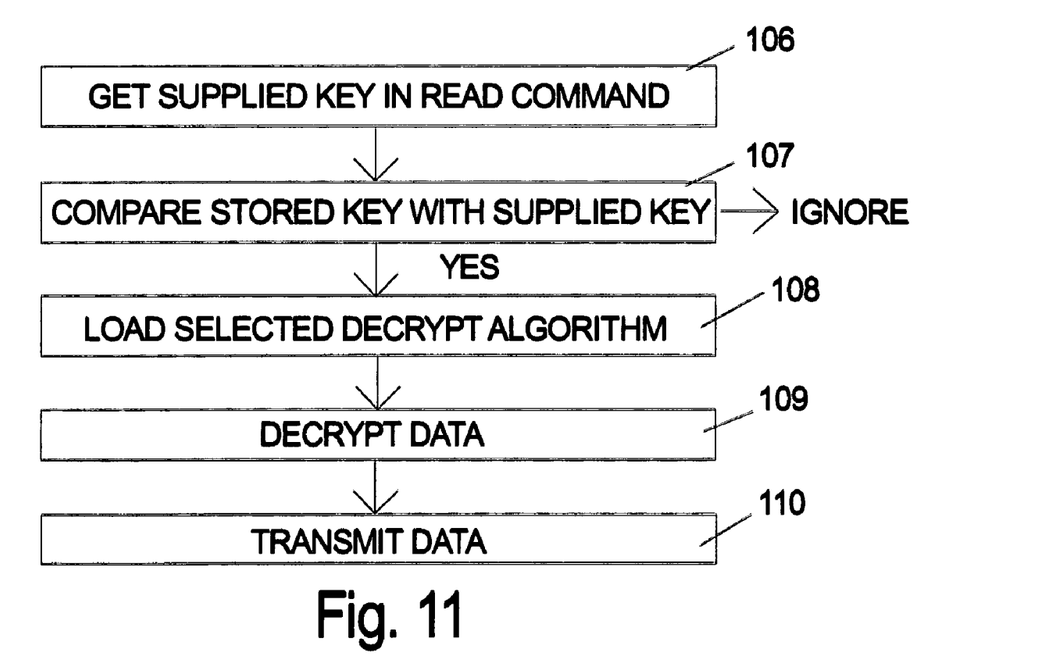
FIG. 11 is a flowchart of a method of decoding encrypted data according to the invention.

An embodiment of the intelligent disk drive incorporates encryption capability. The capability can be achieved by dedicating the task processor described above to encryption or encryption can be one of a plurality of tasks performed by the drive. The term encryption processor as used below is intended to cover either the dedicated processor embodiment or the distributed task embodiment. There will normally be some data stored in the disk drive that is not encrypted so that data passes from the Interface through without alteration, and is recorded on the media. Data that is to be encrypted, on the other hand, is encrypted using the encryption key (or keys) supplied by the host with a predetermined command for write with encryption. Preferably the file level command structure is used with the encryption capability, so that the Intelligent disk drive encrypts an entire file. FIG. 10 is a flowchart for a method of encrypting data according to the invention. The intelligent disk drive retrieves the key or keys from the command from the host 101. The appropriate encryption algorithm code is loaded 102. The data is encrypted 103. The encrypted data is stored 104 and the keys are stored either on the media or in a non-volatile memory associated with the encryption processor 105. FIG. 11 is a flowchart for a method of decrypting data according to the invention. When a file that has been encrypted is requested by the host, the host first supplies the encryption key in a command 106 and the supplied key is compared with the key stored in the disk drive for that data 107. If the keys match, the algorithm code is loaded 108 the file is decrypted 109 and sent to the host 110. If the keys do not match, the disk drive is unresponsive to the request from the host, i.e., the drive ignores the command. Consequently dictionary attacks will be ineffective since the attacker does not receive any response. It could be that the attacker has requested a file that does not exist, or he has supplied the wrong key. As described above, this invention also supports the use of two keys, one for the data and another for the encryption key.

One advantage to having a cryptographic engine in the intelligent disk drive is that the drive can now communicate with the host (or hosts) or any other intelligent disk drive over an insecure channel (such as the SCSI BUS) while making it infeasible for an eavesdropper to invert the encrypted information. The encryption engine moves with the media so even if the drive is removed, it can only be accessed only if the proper keys are supplied. Both the data and the keys are encrypted so accessing the data would very difficult. Optionally the structure of the disk drive can be encrypted so that everything would look like random numbers to an unauthorized reader. In the intelligent disk drive, one could also include a poison pill such that if an improper access were attempted "n" times, the drive could erase all the contents rather than risk divulging the data to a code breaking attempt.

Even in the case where a code breaker could remove the hardware control card with the processor and encryption program and replace it with one that would access the data without the key, the data would still be encrypted as well as the structure of the data so that would reading would yield apparently random numbers. The same applies if the actual disks are physically removed and "read" by some off-line apparatus. Once the drive has the capability to utilize one of the various hand-shaking techniques to form the key, the intelligent disk drive Is now protected from someone removing the drive and accessing the data with another computer. So disk drives are not only secure in the application, they are also secure if the drive is stolen.

The invention has been described with respect to particular embodiments, but other uses and applications for the techniques according to the invention will be apparent to those skilled in the art.

The invention claimed is:

1. A method of operating a disk drive comprising the steps of:

receiving, from a host device on a communication bus, a write command for a write operation with encryption, an encryption key and data to be encrypted and written to disk storage, the write command including a unique identifier;

encrypting the data, recording the data in disk drive storage, and recording the encryption key and the unique identifier in association with the data; and processing a read command received from the host device for the data, the read command including the unique identifier and a decryption key by comparing the decryption key with the encryption key, refusing to decrypt the data if the decryption key and the encryption key are not equal, and sending no response when the decryption key and the encryption key are not equal to hamper a brute force attempt to guess the decryption key, and otherwise, retrieving the data from disk drive storage, decrypting the data and sending the data to the host device.

* * * * *